United States Patent [19]

Matsuda et al.

[11] Patent Number: 4,773,751
[45] Date of Patent: Sep. 27, 1988

[54] INFINITE LEVEL SETTING DEVICE FOR A DISTANCE MEASURING DEVICE

[75] Inventors: Motonobu Matsuda, Kawachinagano; Motohiro Nakanishi, Kobe; Yoshihiro Tanaka, Osaka, all of Japan

[73] Assignee: Minolta Camera Kabushiki Kaisha, Osaka, Japan

[21] Appl. No.: 71,688

[22] Filed: Jul. 9, 1987

Related U.S. Application Data

[63] Continuation of Ser. No. 708,944, Mar. 6, 1985.

[30] Foreign Application Priority Data

Mar. 9, 1984 [JP] Japan .................................. 59-46067
Jun. 8, 1984 [JP] Japan .................................. 59-118706

[51] Int. Cl.$^4$ .......................... G01C 3/00; G03B 3/00
[52] U.S. Cl. ........................................... 356/1; 356/4; 354/403
[58] Field of Search ..................... 356/1, 4; 354/403

[56] References Cited

U.S. PATENT DOCUMENTS

| 4,429,967 | 2/1984 | Tokuda et al. | 354/403 |
| 4,502,724 | 3/1985 | Suzuki et al. | 354/484 |
| 4,529,304 | 7/1985 | Ogawa et al. | 354/403 |

Primary Examiner—Russell E. Adams
Attorney, Agent, or Firm—Watson Cole

[57] ABSTRACT

A distance measuring device for measuring a distance to an object has an LED for projecting a pulse light to the object, photoelectric cells for receiving a reflected pulse light from the object in addition to an ambient light and producing a pulse signal representing the reflected pulse light and a noise signal representing the ambient light, a circuit for generating a level signal which increases as the ambient light becomes brighter, thereby locating the noise signal below the level signal, a comparator for comparing the level signal with the reflected light signal and producing, when the reflected light signal is below the level signal, an infinite signal indicating that the object is located at an infinite distance.

18 Claims, 7 Drawing Sheets

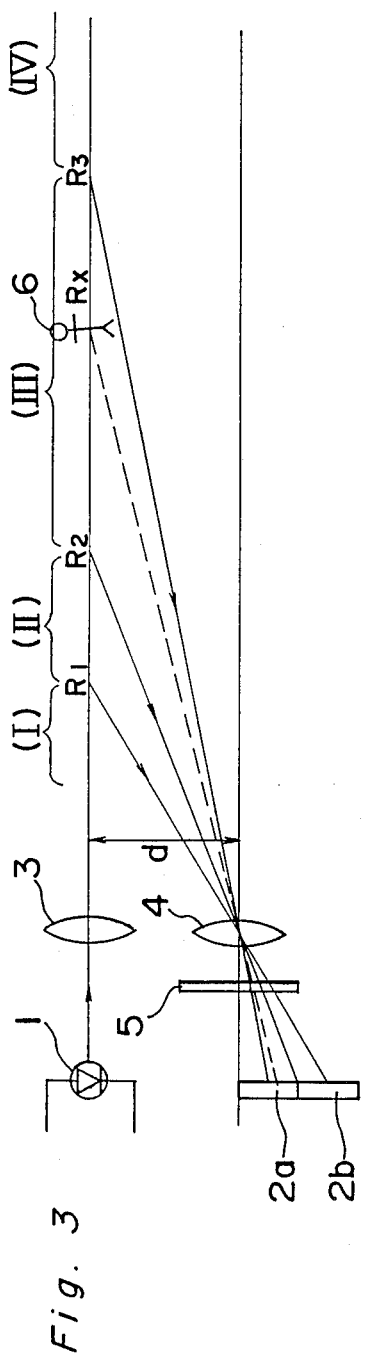
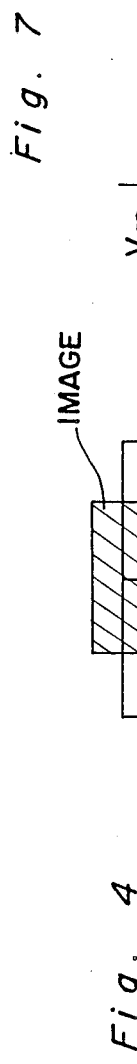
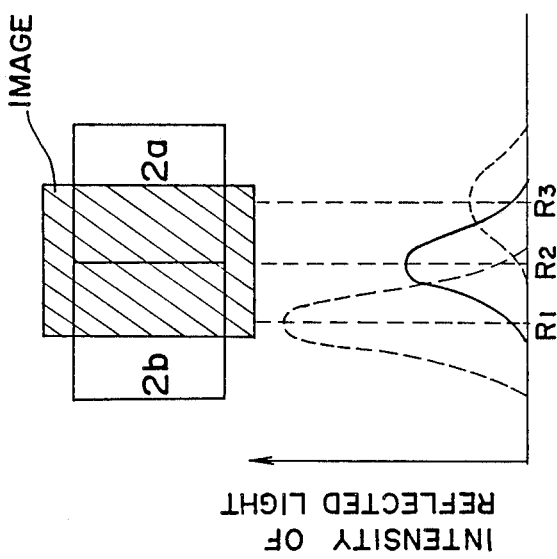

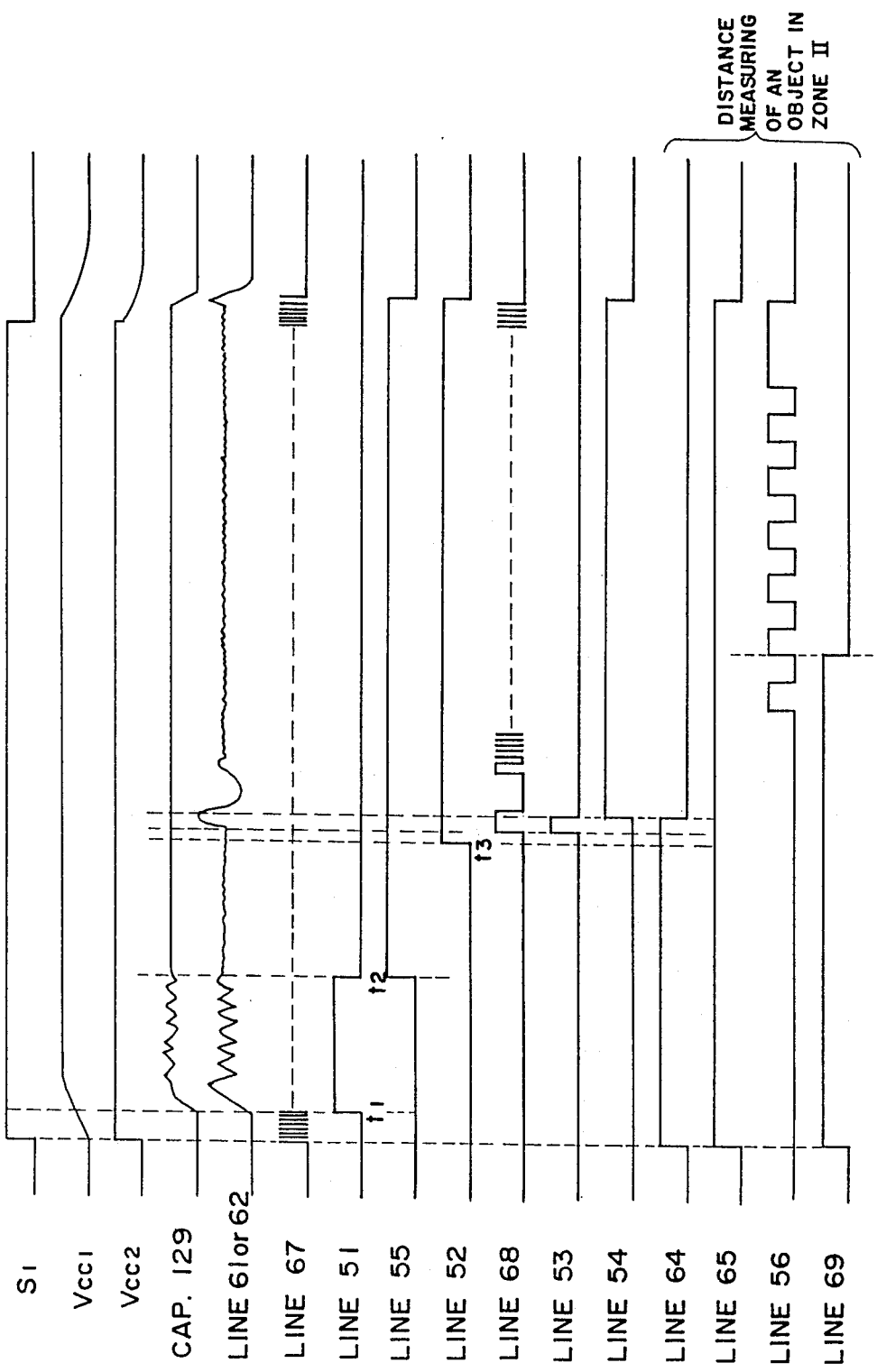

INFINITE LEVEL SETTING DEVICE FOR A DISTANCE MEASURING DEVICE

This application is a continuation application of application Ser. No. 708,944, filed Mar. 6, 1985.

BACKGROUND OF THE INVENTION

1. Field of the Invention

The present invention relates to a distance measuring device of a type which projects light beam to an object and receives a reflected light beam. More particularly, it relates to an improvement of the distance measuring device wherein an object located at an infinite distance (the term "infinite distance" used herein means a distance assumed to be an infinite distance in the field of photograph) can be detected as an infinite distance object without failure.

2. Description of the Prior Art

The reliability of the distance measuring device of the above described type is dependent very much on the received amount of reflected light beam and the amount of noise signals caused by the ambient light. When the object is close to the device, the light beam reflected from the object is strong enough so that a light-representing signal produced by a photoelectric cell as a function of the intensity of such a reflected light beam has a high amplitude and is distinguishable from the noise signals caused by the ambient lights. However, as the object becomes distant, the reflected and received light beam becomes weaker, whereby the signal representing the intensity or amount of the reflected and received light beam will not be high enough to distinguish it over the noise signals.

According to the prior art distance measuring devices of the above described type, the signal produced from the photoelectric cell is compared with a predetermined fixed reference voltage which is a little above the noise signal level. It is to be noted that, in the distance measuring device of the above described type, the noise signal becomes great as the ambient light becomes brighter. In the case where the signal obtained from the photoelectric cell is below the reference voltage, it is assumed that the object is located at an infinite distance.

A problem in the prior art distance measuring device is that the reference voltage must be set at a relatively high level such that the signal is distinguished from the noise signals of various levels, not only those obtained under a dark surroundings, but also obtained under a bright surroundings. Otherwise, that is, if the reference voltage does not have a relatively high level, a noise signal will sometimes be above the reference voltage and may be mistaken as a wanted signal. However, if the reference voltage is set at a relatively high level, a signal, which is distinguishable from the noise signals but is below the reference voltage, can not be detected. Therefore, according to the prior art distance measuring device, the object is assumed to be located at an infinite distance from the time when the object is at a relatively close position.

Furthermore, the prior art distance measuring device has such a problem that the supply voltage will be dropped when the LED is actuated to emit the light beam. This problem adversely affects the distance measuring operation.

SUMMARY OF THE INVENTION

The present invention has been developed with a view to substantially solving the above described problems and has for its essential object to provide an improved distance measuring device.

It is also an essential object of the present invention to provide a distance measuring device of the above described type which can change the reference voltage relatively in accordance with the brightness of the ambient light.

It is a further object of the present invention to provide a distance measuring device which can operate stable even when a power is suddenly changed.

In accomplishing these and other objects, a distance measuring device for measuring a distance to an object according to the present invention comprises means for projecting a light to the object, means for receiving a reflected light from the object and producing a reflected light signal representing the received reflected light, means for receiving the reflected light signal and producing a distance signal representing a distance to the object, means for producing a level signal which is in relation to the intensity of ambient light, and means for comparing the reflected light signal with the level signal, and for producing, when the reflected light signal is below the level signal, an infinite signal indicating that the object is located at an infinite distance.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 3 is a diagrammatic view showing an optical arrangement for measuring a distance to an object;

FIG. 4 is a diagrammatic view showing an image of a reflected light formed on a pair of photoelectric cells, and a distribution of reflected light intensity of the formed image;

FIG. 7 is a graph showing a relationship between an infinite level signal and the brightness of ambient light;

FIG. 8 shows various waveforms obtained from the circuit of FIG. 1;

DESCRIPTION OF THE PREFERRED EMBODIMENTS

Figure 1:
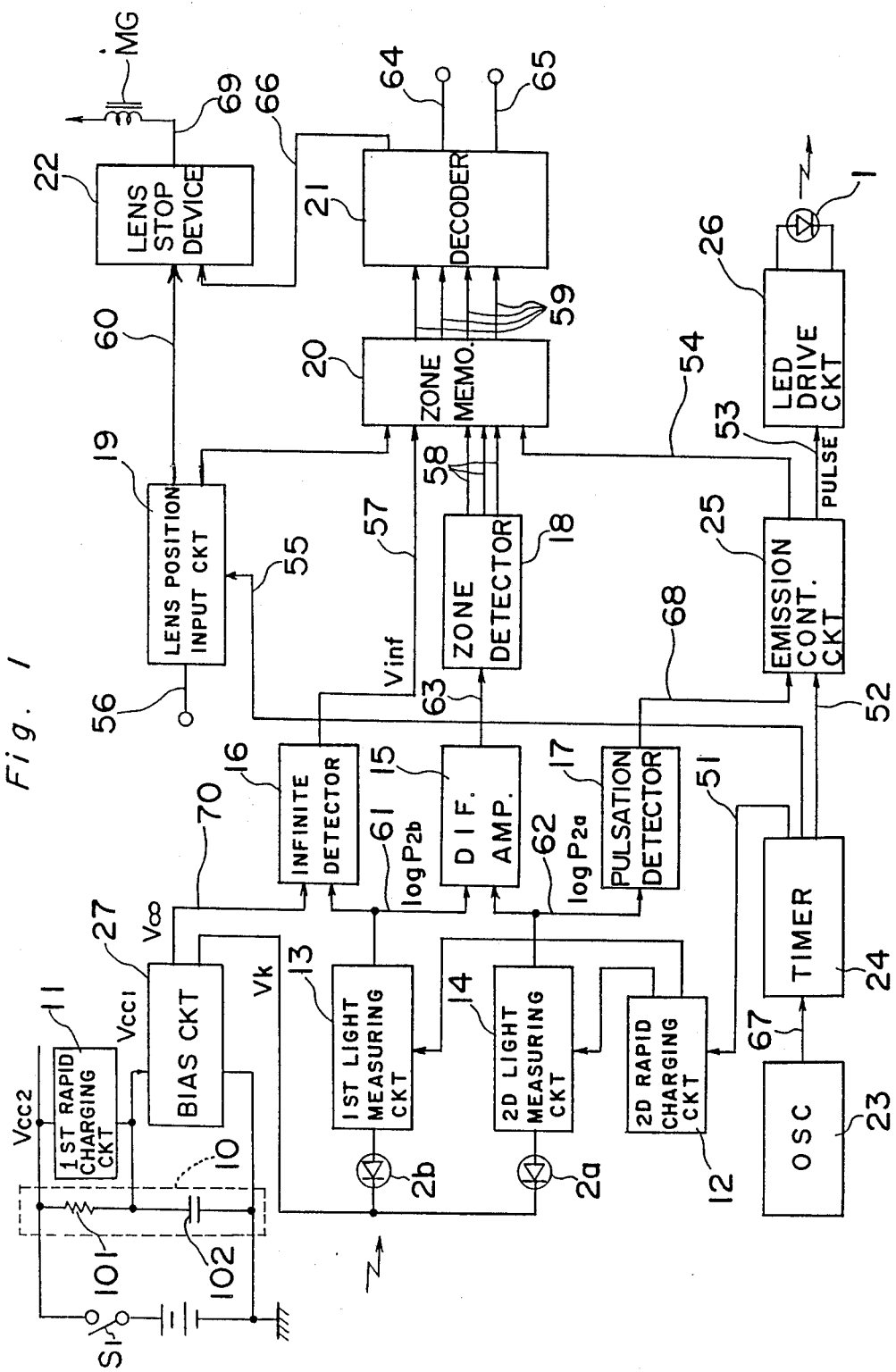
FIG. 1 is a block diagram of a distance measuring device of the present invention employed in a camera system.

Before describing the details of the circuit arrangement of the distance measuring device of the present invention, a principle of the distance measuring employed in the present invention will be described.

Referring to FIGS. 3 and 4, a light beam emitted from a light source, such as an LED 1, is transmitted through a suitable optical arrangement 3 and directed to an object 6. The light beam is reflected on object 6 and is transmitted back to a receiving unit defined by convergent type optical arrangement 4, filter 5 for cutting unwanted lights and photoelectric cells 2a and 2b aligned side by side such that cell 2a is located closer to LED 1 than cell 2b, such that the reflected light beam is formed on photoelectric cells 2a and 2b. A predetermined distance d is provided between optical axes of optical arrangements 3 and 4.

FIG. 4 shows an image of the reflected beam formed on photoelectric cells 2a and 2b, and a graph representing a distribution of light intensity of the formed image. The image depicted on FIG. 4 is the case when the reflected light is from position R2, that is, when object 6 is located at position R2. In this case, the image by the reflected light beam will expand equally on photoelectric cells 2a and 2b. Therefore, the distribution of light intensity shows a peak point at a border between cells 2a and 2b. Thus, when the output powers from photoelectric cells 2a and 2b are indicated as P2a and P2b, respectively, a relationship therebetween is such that P2a is equal to P2b.

When the object is located at a position R1 which is closer than the position R2, a greater area of the image will be formed on photoelectric cell 2b than cell 2a. In this case, the intensity of the image will be stronger. Thus, a relationship between the output powers P2a and P2b is such that P2a is smaller than P2b.

When the object is located at a position R3 which is farther than the position R2, a greater area of the image will be formed on photoelectric cell 2a than cell 2b. In this case, the intensity of the image will be weaker. Thus, a relationship between the output powers P2a and P2b is such that P2a is greater than P2b.

Figure 5:
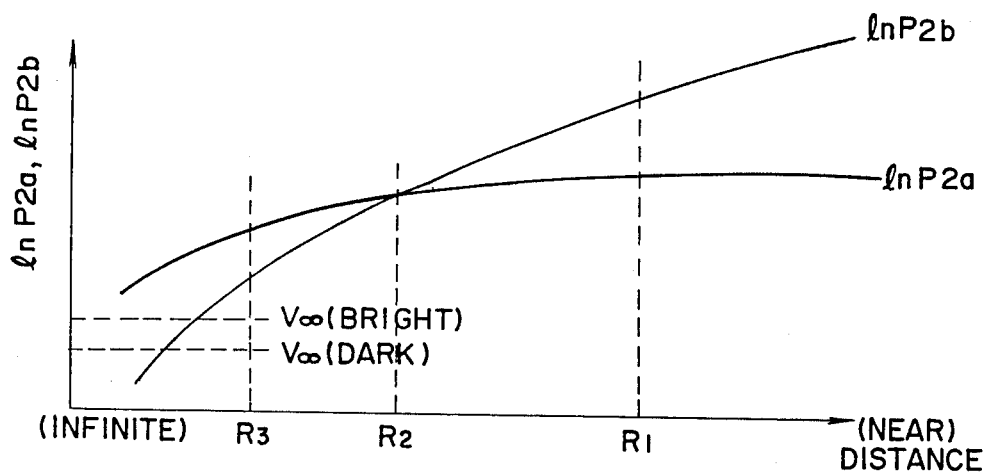
FIG. 5 is a graph showning a logarithmically compressed signal level of signals obtained from photoelectric cells in different distances.

FIG. 5 shows the change of output powers P2a and P2b indicated in a logarithmically compressed fashion with respect to the change in distance.

Figure 6:
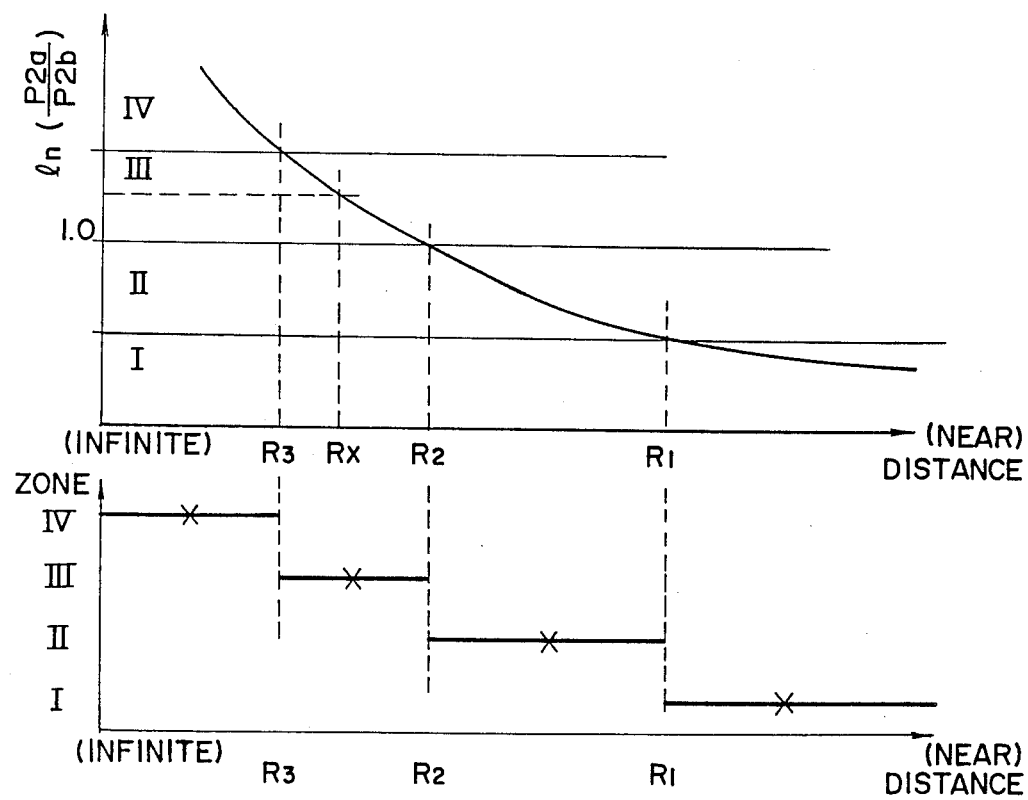
FIG. 6 is a graph showing a ratio of two signals shown in FIG. 5, and distance zones divided relative to the ratio.

FIG. 6 shows the change of a ratio P2a/P2b indicated in a logarithmically compressed fashion with respect to the change in distance. As apparent from the graph of FIG. 6, the ratio ln(P2a/P2b) gradually decreases as the distance increases. Accordingly, when the ratio ln(P2a/P2b) is obtained, it is possible to calculate a distance Rx to the object. The distance may be obtained discretely or by way of indicating one of distance zones.

The description hereinbelow will be directed to a distance zone finding device employed in a camera.

The distance is divided into a number of, such as four, zones determined by the depth of field of an objective lens of the camera. A signal indicating the zone can be obtained by a comparison between the actually obtained ratio signal representing a ratio ln (P2a/P2b) and one of reference signals representing a ratio ln (P2a/P2b) at different distances where the zone changes. For example, when the object is located at a distance Rx which is between the distances R2 and R3 indicated in FIG. 3, an image of the reflected beam will be formed on both photoelectric cells 2a and 2b, but a portion of the image will be a little greater on cell 2a than that on cell 2b. In this case, it is detected that the object is located within zone III, shown in FIG. 6. Such a detection is carried out a distance measuring circuit described below.

Referring to FIG. 1, a block diagram of a distance measuring circuit for use in a camera is shown. A switch S1 is provided in association with a camera's shutter button (not shown) such that switch S1 turns on upon depression of the shutter button. When switch S1 turns on, a first rapid charging circuit 11 is actuated to charge a capacitor 102, provided in a stabilizing voltage source 10, rapidly. Thus, a stable voltage Vcc1 is produced. Furthermore, by the turn on of switch S1, a timer 24 is started. When a predetermined time t1 (FIGS. 8 and 9) is counted by timer 24, a HIGH level signal (a rapid charge completion signal) is transmitted through a line 51 to a second rapid charging circuit 12, which thereupon is actuated to immediately supply a stable voltage to each of first and second light measuring circuits 13 and 14. The supply of such a stable voltage to light measuring circuits 13 and 14 continues until timer counts up to time t2 (FIG. 8). Then, at time t2, a LOW level signal is transmitted through line 51 so as to disable the second rapid charging circuit 12.

Then, at time t3 as counted by timer 24, a HIGH level signal (a distance measuring enable signal) is transmitted from timer 24 through line 52 to an emission control circuit 25, whereby emission control circuit 25 produces a pulse signal through a line 53 to an LED drive circuit 26. Thus, an LED 1 emits a pulse light which is directed to and reflected on object 6. The reflected light returns back to the camera and is received by photoelectric cells 2a and 2b. The signals P2a and P2b produced from photoelectric cells 2a and 2b are applied, respectively, to first and second light measuring circuits 13 and 14, which then produce logarithmically compressed brightness signals logP2a and logP2b. In addition to the reflected pulse light, photoelectric cells 2a and 2b receive ambient lights which will result in noise signals.

A signal Vk representing the brightness of the object as produced from photoelectric cells 2a and 2b is transmitted to a bias circuit 27 which produces an infinite level signal $V_\infty$ for controlling infinite detection circuit 16. As will be described in detail later, the infinite level signal $V_\infty$ varies depending on the brightness of the object such that the infinite level signal $V_\infty$ increases as the object becomes brighter, as indicated in FIG. 7.

Infinite detection circuit 16 receives the infinite level signal $V_\infty$ and compares the logarithmically compressed brightness signal logP2b from the first light measuring circuit 13 with the infinite level signal $V_\infty$. When the brightness signal logP2b is lower than the infinite level signal $V_\infty$, infinite detection circuit 16 produces an infinite signal Vinf which is applied through a line 57 to a zone memory 20.

The logarithmically compressed brightness signal logP2b from the first light measuring circuit 13 is also transmitted through a line 61 to a differential amplifier 15. Similarly, the logarithmically compressed brightness signal logP2a from the second light measuring circuit 14 is transmitted through a line 62 to differential amplifier 15. Differential amplifier 15 subtracts the logarithmically compressed brightness signal logP2b from the logarithmically compressed brightness signal logP2a, and produces through a line 63 a signal representing a difference therebetween, which is substantially equal to a ratio of the output signals, i.e., P2a/P2b. This ratio indicates the ratio of the image split on photoelectric cells 2a and 2b, as shown in FIG. 4.

The output signal logP2b is also used in infinite detection circuit 16 for the detection such that the received light reflected from the object is very weak indicating that the object is located very far. The output signal logP2a is also used in a pulsation detector 17 for detecting the pulsating change in the ambient light, such as under the fluorescent lamp driven by a commercial AC power.

The signal logP2a/P2b produced from differential amplifier 15 is applied through a line 63 to a zone detector 18 which detects one of the distance zones which the object is located at. A zone signal representing the detected zone is transmitted through a bundle of lines 58 to zone memory 20 and is stored therein in response to a memory signal, which is in a synchronized relationship with a pulse signal applied through line 53, obtained from emission control circuit 25.

The zone signal stored in zone memory 20 is further transmitted through a bundle of lines 59 to a decoder 21 and still further to a camera control unit (not shown) through lines 64 and 65 and also to a lens stop device 22 through a line 66.

When the camera's shutter button is depressed all the way down, the objective lens (not shown) starts to move by a driving device (not shown) and produces a position signal representing the lens position. The position signal is applied through a line 56 to a lens position input circuit 19. A signal produced from lens position input circuit 19 is compared with the zone signal in lens stop device 22. When the two signals coincide with each other, lens stop device 22 produces a signal which de-energizes an electromagnet MG, thereby immediately stopping the lens.

Figure 2:
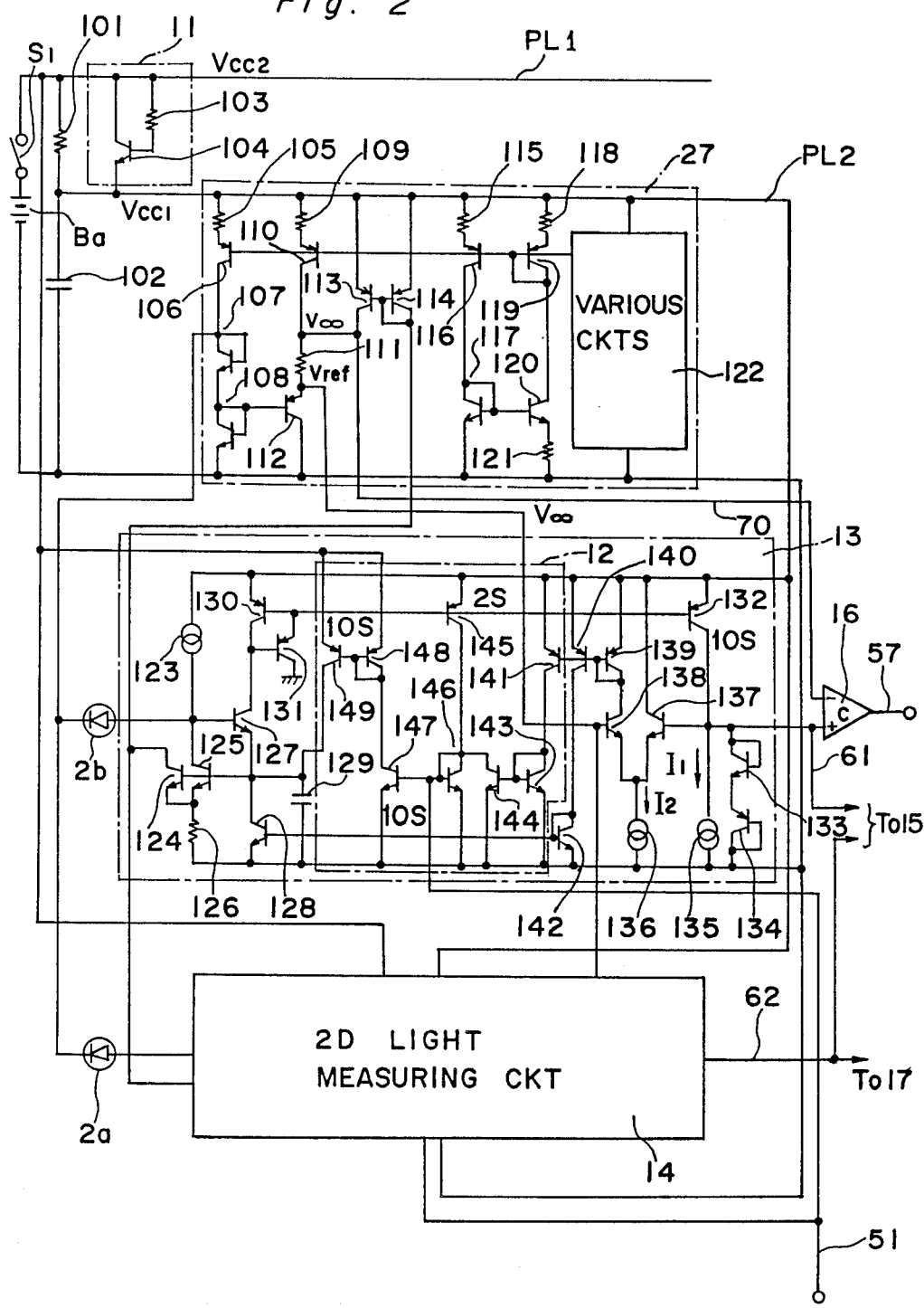
FIG. 2 is a circuit diagram showing a detail of bias circuit and first light measuring circuit shown in FIG. 1.
Figure 9:
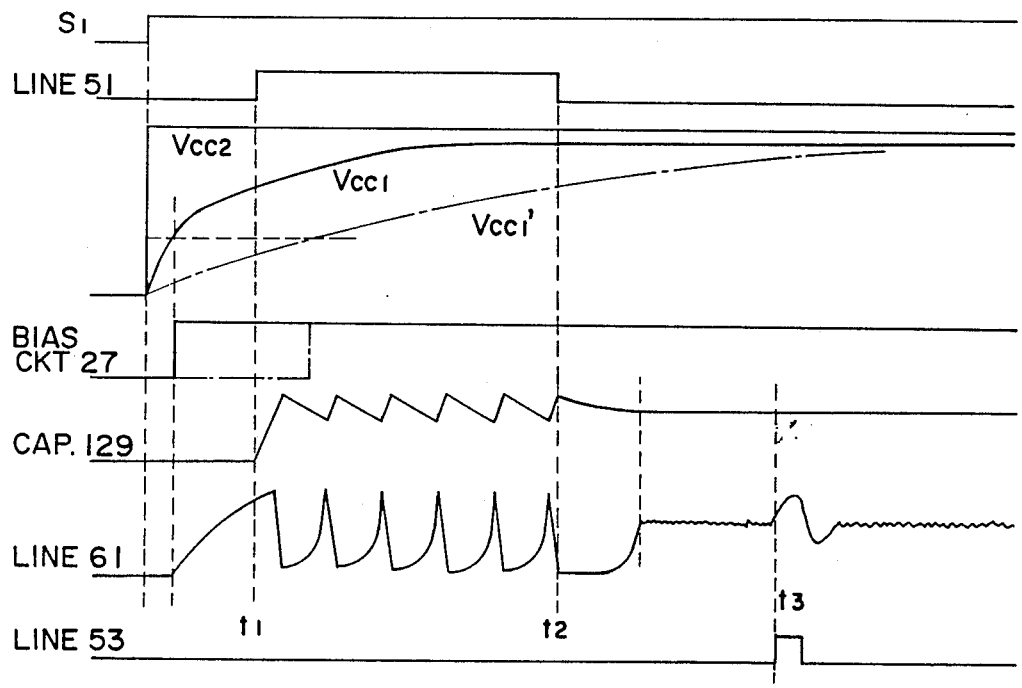
FIG. 9 shows various waveforms, particularly showing a wave change during the initial set up of the distance measuring circuit.

Referring to FIG. 2, a circuit diagram of bias circuit 27, first rapid charging circuit 11, second rapid charging circuit 12, first light measuring circuit 13, second light measuring circuit 14 and infinite detecting circuit 16 is shown. The waveforms of the signals produced from the circuit of FIG. 2 are shown in FIG. 9.

Figure 12:
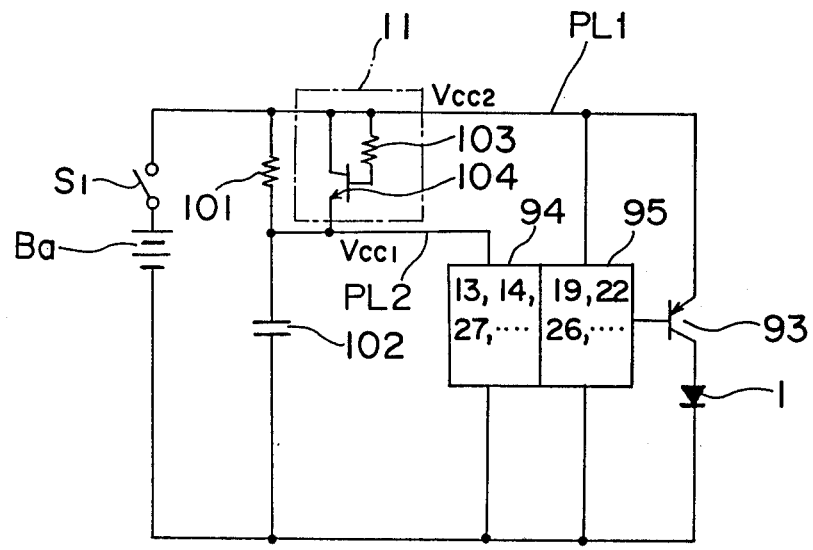
FIG. 12 is a circuit diagram particularly showing a power supply circuit with a rapid charging circuit according to a preferred embodiment of the present invention.

In response to the first half depression of the shutter button, switch S1 turns on, thereby providing a power Vcc2 to a power line PL1 from a battery Ba. Light emitting diode 1 and its associated elements, such as transistor and resistor, are connected to battery Ba, and therefore, the voltage across battery Ba varies when LED 1 is actuated. A power Vcc1, which is stabilized by resistor 101 and capacitor 102, is supplied through a power line PL2 to the circuits, such as bias circuit 27, and light measuring circuits 13 and 14. Since power Vcc1 is stable, circuits connected thereto will not be adversely affected by a voltage change especially when carrying out the distance measuring, such as caused by the emission of the pulse light from LED 1. As diagrammatically shown in FIG. 12, power line PL1 is directed to a box 95 which includes various circuits which will operate without any problem even when the supplied voltage fluctuates, such as to circuits 19, 22, 26, etc., shown in FIG. 1, and also through a transistor 93 to LED 1. Power line PL2 is directed to a box 94 which includes various circuits which requires a stable voltage through out the operation, such as to circuits 13, 14, 27, etc., shown in FIG. 1.

The first rapid charging circuit 11 is provided for shortening the time for establishing the stable voltage Vcc1 after the turn on of switch S1. It comprises an NPN transistor 104 having its collector connected to power line PL2 and emitter connected to power line PL1, and a resistor 103 connected between the base of transistor 104 and power line PL1. When switch S1 is turned on, a collector current $I_C$, which is equal to a base current $I_B$ flowing through resistor 103 to the base of transistor 104 multiplied by $h_{FE}$, is generated. Thus, a current $I_B+I_C$ flows through transistor 104. Accordingly, when switch S1 is turned on, capacitor 102 is charged not only by a current flowing through resistor 101 but also by a current flowing through transistor 104. Thus, at the beginning, the voltage Vcc1 abruptly rises, as shown in FIG. 9. As the voltage on power line PL2 increases, the base current $I_B$ is reduced, and the collector current $I_C$ is also reduced. Thus, when the voltage level on power line PL2 reaches close to the voltage Vcc1, the charging current from transistor 104 is reduced almost to zero, but the charging current from resistor 101 continues to flow. Therefore, a curve representing the charge in capacitor 104 will be rather broken, as shown in FIG. 9.

If there were no rapid charging circuit 11, capacitor 102 is charged only by the current flowing through resistor 101 in accordance with the time constant of resistor 101 and capacitor 102. Therefore, it takes a long time before the stable voltage Vcc1 is established, such as shown by a chain line Vcc1' in FIG. 9.

Next, the description is directed to the second rapid charging circuit 12 which is illustrated in detail approximately at the center of FIG. 2. As shown in FIG. 9, the voltage Vcc1 is rapidly established by the first rapid charging circuit 11. It is waited until the bias voltage is set up. Then, when a time t1 is counted, timer 24 generates a rapid charge completion signal which is transmitted through line S1 to each light measuring circuit.

At this time, if a capacitor 129 of the first light measuring circuit 13 is not charged to a sufficient level, as in usual cases, no current will flow through a transistor 125. Therefore, a bias current from a constant current source 123 will all be directed to the base of transistor 127, which then generates a collector current which is equal to $h_{FE}$ times the base current. The collector current is further amplified by transistors 130 and 132 by the rate of area ratio between transistors 130 and 132, such as 1:10. The amplified current flows from the collector of transistor 132. Since this collector current from transistor 132 is much greater than the current generated by a constant current source 135, a voltage signal carried on line 61 will be higher than a reference voltage Vref from bias circuit 27. Thus, no current will flow through a transistor 138 and, thus, no current will flow through any one of transistors 139, 140, 141, 142, 143, 144 and 128. But, a current flows through a transistor 145 at a level which is proportional to the current flowing through transistor 130 and determined by the area ratio between transistors 145 and 130, such as a ratio 2:1. The current flowing through transistor 145 is amplified by transistors 146 and 147 at a rate determined by the area ratio between transistors 146 and 147 (such as 1:10) and further amplified by transistors 148 and 149 at a rate determined by the area ratio between transistors 148 and 149 (such as 1:10). The amplified current flowing through transistor 149 is used for charging capacitor 129. Thus, as shown in FIG. 9, capacitor 129 starts charging from time t1. When the voltage charged across the capacitor 129 exceeds a little over a required stable level, the base voltage of transistor 125 exceeds a little over a stable level. Therefore, the collector current of transistor 125 becomes greater than the stable condition. Thus, transistor 125 serves as a bypass circuit for permitting bias current from constant current source 123 and photocurrent from photoelectric cell 2b to flow therethrough.

When the bypass circuit is established by transistor 125 in a manner described above, transistor 127 receives no base current and, therefore, no collector current will flow through transistors 130 and 132. Thus, a voltage level on line 61 will become lower than the reference voltage Vref. In this case, all the current from constant current source 136 flows through transistor 138 and, therefore, the same amount of current as that through transistor 138 flows through each of transistors 139, 140, 141, 142, 143, 144 and 128. Since, in this case, no current flows through transistor 130, no current will flow through each of transistors 146, 147, 148 and 149. Thus, the second rapid charging circuit 12 stops its operation.

Therefore, by a collector current of transistor 128, capacitor 129 is discharged. During the discharge, when capacitor 129 reaches a level which is a little below the required stable level, some percentage of total currents of the bias current from constant current source and photocurrent from photoelectric cell 2b starts to flow, as a base current, through transistor 127. Thus, transistor 127 generates a collector current which is $h_{FE}$ times the base current. Thereafter, in the same way as described above, the capacitor 129 is again charged to a level a little greater than the required stable level. Thus, capacitor 129 repeats charging and discharging operations. If the switching of the employed transistors has no loss time, as in an ideal transistor, the voltage charged across capacitor 129 rises from zero to the required stable level without any fluctuation. But, since the transistors have more or less delay in their switching operation, the charged voltage across capacitor 129 shows a sawtooth waveform, as depicted in FIG. 9. The charging and discharging continues until the time t2. When timer 24 counts up to time t2, the rapid charge completion signal on line 51 disappears, i.e., the signal on line 51 becomes LOW, thereby forcibly turning transistor 147 off. Thus, rapid charging circuit 12 is disabled.

At time t2, since the voltage across capacitor 129 is very close to the required stable level, the first light measuring circuit 13 becomes stable in a very short period of time. The second light measuring circuit 14 has the same circuit arrangement as that of the first light measuring circuit 13 and, therefore, the same can be said to the second light measuring circuit 14.

Next, the operation of first light measuring circuit 13 will be described in detail using specific data as an example.

First, a case when line 61 is carrying a voltage equal to Vref, that is when the first light measuring circuit 13 is in the stable condition, is considered. When it is assumed that current I1 through constant current source 135 is 10 microamperes and current I2 through constant current source 136 is 2 microampers, it is necessary to hold the collector currents of both transistors 137 and 138 equal to 1 microampere, so as to establish the above-mentioned case. Furthermore, in this case, each of transistors 139, 140, 142 and 128 has a collector current equal to 1 microampere. Accordingly, transistors 127 and 130 each generates collector current equal to 1 microampere. When the area ratio between transistors 130 and 132 is 1:10, the collector current of transistor 132 will be equal to 10 microamperes, thereby balancing the current generated by constant current source 135.

Under the stable condition as described above, when no light impinges on photoelectric cell 2b, the bias current from constant current source 123 flows through transistor 125 and resistor 126, provided that the base current to transistor 127 is disregarded. When an ambient light, such as sun light impinges on photoelectric cell 2b, both the photocurrent from cell 2b and the bias current from constant current source 123 flow through transistor 125 and resistor 126.

As will be understood from the further description, transistor 125 and resistor 126 are provided to form a bypass circuit for allowing constant current, generated by a ambient light, to flow therethrough. It is assumed that the camera's aiming angle is changed from a dark plain wall to a bright plain wall. In this case, since the base of transistor 125 is limited to a voltage determined by capacitor 129, the collector current of transistor 125 will not be any greater than the collector current generated during the stable condition. Therefore, the increase ($i_L$) of photocurrent caused by the change in brightness will be directed to the base of transistor 127. Thus, transistor 127 generates a collector current which is equal to $h_{FE}$ times the base current $i_L$. This collector current is further amplified by transistors 130 and 132 by a rate which is equal to the area ratio 1:10 between transistors 130 and 132. Thus, transistor 132 generates an amplified current from its collector. This current is fed through logarithmic compression diodes 133 and 134 and, therefore, the voltage on line 61, which is the output of light measuring circuit 13, increases. When the voltage on line 61 increases, an conductivity balance between transistors 137 and 138 is lost and, therefore, the collector current of transistor 138 is reduced. Thus, collector currents of transistors 139, 140 and 142 are reduced and, further, the collector current of transistor 128 is also reduced. Therefore, the collector current from transistor 127 is used for charging capacitor 129, thereby increasing the voltage across the capacitor 129, i.e., increasing the base voltage of transistor 125.

Accordingly, the collector current of transistor 125 increases, whereby transistor 125 bypasses the increased current $i_L$, which is caused by the increase in the brightness of the object. Then, the collector current of transistor 127 is reduced, thereby setting the light measuring circuit in a stable condition. As is apparent from the above description, a negative feedback circuit is defined by transistors 127, 130, 132, 137, 138, 139, 140, 142, 128 and 125. When there is no capacitor 129, the feedback signal is applied immediately to transistor 125. On the contrary, if a capacitor with a high capacitance is employed at 129, it takes time to apply the feedback signal. When carrying out the distance measuring, LED 1 emits a pulse light, and the photoelectric cell receives the reflected light, causing an increase of the photocurrent by an amount $di_L$. The increment $di_L$ is amplied in transistor 127 by $h_{FE}$ and further amplified by transistors 130 and 132 at the rate of area ratio. When the current flowing through logarithmic compression diodes 133 and 134 is assumed to be equal to $i_D$, the increase in the output signal on line 61 caused by the increment $di_L$ can be given as follows:

$$2 \times \frac{kT}{q} \ln(10 \times h_{FE} \times di_L/i_D).$$

Since the distance measuring is effected in a very short period of time, there will be hardly any change in the voltage across capacitor 129. Therefore, no feedback will be effected during the distance measuring. In other words, capacitor 129 is so selected as to have a capacitance which is small enough to have a quick response to the change in the ambient light, but large enough to hold the voltage unchanged during the distance measuring. The same can be said to the second light measuring circuit 14.

Next, the description is directed to the infinite level signal $V_\infty$ produced particularly under the bright ambient light.

As has been described above, under the stable condition of the first light measuring circuit 13, the photocurrent $i_L$ from photoelectric cell 2b and the bias current from constant current source 123 are partially fed to transistor 127 as a base current and mostly fed to transistor 125 as a collector current. Transistors 125 and 124 have a common base and a common emitter. Therefore, the collector current of transistor 124 is the same as the collector current of transistor 125. In other words, under the bright ambient light, the collector current of transistor 124 is approximately equal to the photocurrent $i_L$ from photoelectric cell 2b, and under the dark ambient light, it is approximately equal to the bias current from constant current source 123.

Furthermore, the collector of transistor 124 is connected to the collector of an analogous transistor provided in the second light measuring circuit 14, and further connected to the base and collector of transistor 114. Accordingly, the collector current of transistor 114 is approximately equal to the sum of photocurrents generated by photoelectric cells 2a and 2b under the bright ambient light, and it is approximately equal to a double of the bias current produced from constant current source 123 under dark ambient light.

Bias circuit 27 has transistors 113 and 114 which define a mirror circuit and, therefore, transistor 113 generates a collector current in the same amount as the collector current of transistor 114. The collector of transistor 113 is connected to a junction between a collector of transistor 110 and resistor 111. Resistor 111 is provided for producing the infinite level signal $V_\infty$ when the constant current from transistor 110 added with the collector current from transistor 113 flows therethrough. The other end of resistor 111 is connected to an emitter of transistor 112 which is coupled with a transistor 108 arranged in a diode connection. Transistors 112 and 108 are provided for establishing a reference voltage $V_{ref}$ which is applied to the base of transistor 138 in the first light measuring circuit 13 and also to a base of an analogous transistor provided in the second light measuring circuit 14.

As apparent from the foregoings, the infinite level signal $V_\infty$ is equal to the sum of the reference voltage Vref and the voltage across the resistor 111. Since the collector current of transistor 113 is low under the dark ambient light and high under the bright ambient light, the infinite level signal $V_\infty$ gradually increases as the ambient light becomes brighter, as shown in FIG. 7.

Figure 10:
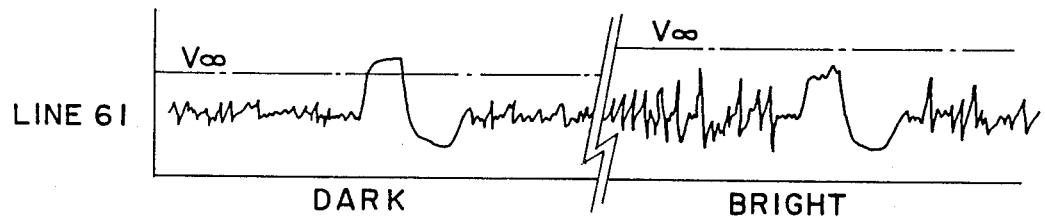
FIG. 10 shows a waveform of output signal from photoelectric cell under the dark ambient light and bright ambient light.
Figure 11:
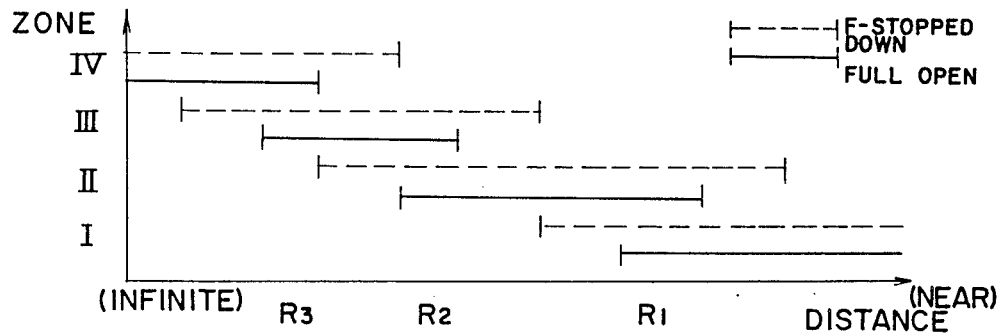
FIG. 11 shows a coverage of each zone in F-stopped down case and aperture full open case.

Under the dark ambient light, the noise signal level is relatively low and, therefore, the infinite level signal $V_\infty$ is made relatively low, such as shown in FIG. 10. In this case, a signal representing the reflected light having a relatively low intensity will be above the infinite level signal $V_\infty$ and, therefore, it can be detected. Furthermore, since the noise signal, on which the wanted pulse signal is imposed, has a low amplitude, the wanted pulse signal can be detected with less failure even when the infinite level signal $V_\infty$ is reduced to a relatively low level.

On the contrary, under the bright ambient light, the noise signal level is relatively high and, therefore, the infinite level signal $V_\infty$ is made relatively high, as shown in FIG. 10. In this case, a signal representing the reflected light having a relatively low intensity will be below the infinite level signal $V_\infty$ and, therefore, it can not be detected. Furthermore, since the noise signal, on which the wanted pulse signal is imposed, has a high amplitude, the infinite level signal $V_\infty$ is made relatively high, or otherwise, there will be many false detections.

Whenever the wanted pulse signal is below the infinite level signal $V_\infty$, it is assumed that the object is located at an infinite distance zone. Since the infinite level signal $V_\infty$ becomes low as the ambient light becomes dark, the infinite distance zone is assumed to be relatively close under the bright ambient light and relatively far under the dark ambient light. However, when taking a photograph under the bright ambient light, the lens aperture is usually stopped down to a small diameter and, therefore, the field depth is very wide. Thus, less problem arises by setting the infinite level signal $V_\infty$ to a relatively high level, than to set it in a low level and have a number of false detections.

According to the preferred embodiment described above, the infinite level is determined by the use of two photoelectric cells 2a and 2b, but it may be determined by a single photoelectric cell, either cell 2a or cell 2b, or any other photoelectric cell.

Figure 13:
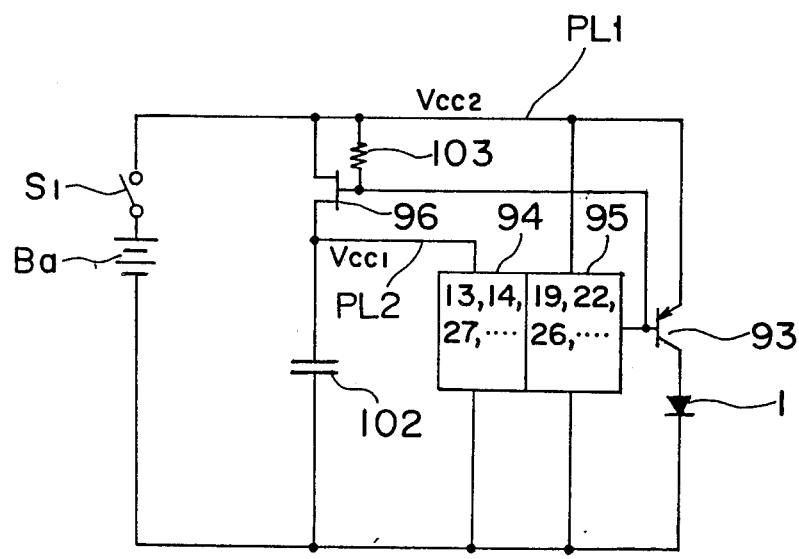
FIG. 13 is a circuit diagram particularly showing a standard power supply circuit which can also be used in the present invention.

Furthermore, according to the present invention, any known power source circuit can be employed, such as shown in FIG. 13. According to this circuit, capacitor 102 is connected to FET 96 having its base connected to base of transistor 93. Normally, when switch S1 turns on, FET 96 conducts, thereby supplying current to capacitor 102 to provide a stable voltage Vcc1. When a negative going pulse is applied to the base of transistor 93 to emit light from LED 1, FET 96 is temporarily turned off to prevent capacitor 102 from being adversely affected by the momentary voltage drop on line PL1, as caused by the power supply to LED 1.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A distance measuring device for measuring distance to an object, comprising:
   means for projecting light to said object;
   first and second photoelectric means aligned side-by-side for receiving light reflected from said object and producing first and second light signals respectively representing the amounts of received light, said first photoelectric means being disposed closer to said projecting means than said second photoelectric means;
   means for calculating the ratio of the amounts of received light based on said first and second light signals and determining the distance in accordance with the calculated ratio; and means for comparing the level of the second light signal with a predetermined level, and for determining when said second light signal is below said predetermined level, indicating that the object is located at an infinite distance, regardless of the detected ratio.

2. A distance measuring device as claimed in claim 1, wherein said comparing means includes means for measuring the intensity of ambient light and varying the predetermined level in accordance with the intensity of ambient light.

3. A distance measuring device for measuring distance to an object, comprising:

means for projecting light to said object;

first and second photoelectric means aligned side-by-side for receiving reflected light from said object in addition to ambient light and producing first and second light signals respectively representing the amounts of received light, said first photoelectric means being disposed closer to said projecting means than said second photoelectric means;

means for separating each light signal into an ambient light component and a reflected light component;

means for calculating, based on the reflected light components of the first and second light signals, a ratio of the amounts of received light based on the reflected light components of the first and second light signals and determining distance in accordance with the calculated ratio; and means for comparing the level of the reflected light component of the second light signal with a predetermined level, and for determining, when said second signal is below said predetermined level, that the object is located at an infinite distance, regardless of the detected ratio.

4. A distance measuring device as claimed in claim 3, wherein said comparing means includes means for varying the predetermined level in accordance with the intensity of ambient light.

5. A distance measuring device as claimed in claim 4, wherein said varying means comprises means for establishing the level signal based on the separated ambient light component of the light signal.

6. A distance measuring device as claimed in claim 5, wherein said separating means comprises a bypass circuit for permitting the current flow of only the ambient light component.

7. A distance measuring device as claimed in claim 5, wherein said establishing means comprises current generating means for generating a current representative of the ambient light component, and a resistor for receiving said current and establishing a voltage level signal across said resistor.

8. A distance measuring device as claimed in claim 3, further comprising a stable power source for supplying constant power to said generating means.

9. A distance measuring device as claimed in claim 8, wherein said constant power source comprises a DC power source for supplying power directly to said light projecting means, a capacitor across which a stable voltage for supplying power to said separating means, calculating means and said comparing means is generated, means for restricting, serially-connected between said DC power source and said capacitor, a current therethrough, and a rapid charging circuit connected in parallel with said restricting means for rapidly charging said capacitor, whereby the current for charging said capacitor is large from said rapid charging circuit when a voltage across said capacitor is low and the current for charging said capacitor is small from said restricting means when the voltage across said capacitor is high.

10. A distance measuring device for measuring distance to an object, comprising:

means for projecting light to said object;

first and second photoelectric means aligned side-by-side for receiving light reflected from said object and producing first and second light signals respectively representing the amounts of received light, said first photoelectric means being disposed closer to said projecting means than said second photoelectric means;

means for calculating the ratio of the amounts of received light based on said first and second light signals and determining the distance in accordance with the calculated ratio; and means for comparing the level of at least one of the first and second light signals with a predetermined level, and for determining when the former is below the latter, indicating that the object is located at an infinite distance, regardless of the detected ratio, said comparing means further including means for measuring the intensity of ambient light and means for varying the predetermined level in accordance with the intensity of ambient light.

11. A distance measuring device for measuring distance to an object, comprising:

means for projecting light pulses to said object;

means for receiving light from said object;

maintaining means, including a capacitor for storing the output of said receiving means during non-light projection of the projecting means, for maintaining by means of said capacitor a signal corresponding to the output of said receiving means during said non-light projection;

means for extracting components of light pulses projected to said object and reflected therefrom by obtaining the difference between the output of said receiving means during projection of light pulses and the signal from said maintaining means;

means for determining the distance in accordance with said difference;

means for supplying power at least to said receiving means and maintaining means; and means for rapidly charging said capacitor from the supplying power means.

12. A distance measuring device as claimed in claim 11, wherein said rapid charging means is operable for a given time.

13. A distance measuring device for measuring distance to an object, comprising:

means for projecting light pulses to said object;

means for receiving light from said object and generating a photoelectric current representing the amount of received light;

maintaining means, connected to said receiving means and including a capacitor for storing the output of said receiving means during non-light projection from said projecting means, for maintaining by means of said capacitor a current corresponding to the photoelectric current from said receiving means during said non-light projection;

means for extracting components of light pulses projected to said object and reflected therefrom by obtaining the difference between the photoelectric current from said receiving means during projection of light pulses and the current from said maintaining means;

means for determining the distance in accordance with said difference;

means for supplying power at least to said receiving means and maintaining means; and means for rapidly charging said capacitor from the supplying power means.

14. A distance measuring device as claimed in claim 13, wherein the rapid charging means is operable for a given time.

15. A distance measuring device for measuring distance to an object, comprising:

means for projecting light pulses to said object;

means for receiving light from said object and generating a photoelectric current representing the amount of received light, the photoelectric current during projection of light pulses including a reflected light pulse component projected by the projecting means and reflected from said object and an ambient light component;

maintaining means, connected to said receiving means and including a capacitor for storing the output of said receving means during non light projection from said projecting means, for maintaining by means of said capacitor a current corresponding to the photoelectric current from said receiving means during said non-light projection;

means for extracting the reflected components of light pulses of the photoelectric current during projection of light pulses, said extracting means being connected to said receiving means and maintaining means such that the ambient light component of the photoelectric current during the light projection is eliminated by the maintained current;

means for determining the distance in accordance with the obtained reflected light pulse component;

means for supplying power at least to said receiving means and maintaining means; and means for rapidly charging said capacitor from the supplying power means.

16. A distance measuring device as claimed in claim 15, wherein said rapid charging means is operable for a given time.

17. A distance measuring device for measuring distance to an object, comprising:

means for projecting light pulses to said object;

means for receiving light from said object and generating a photoelectric current representing the amount of received light, the photoelectric current during projection of light pulses including a reflected light pulse component projected by the projecting means and reflected from said object and an ambient light component;

maintaining means for maintaining the ambient light component of the photoelectric current, said maintaining means including a capacitor for storing a signal corresponding to the output of said receiving means during the light-projection, and bypassing means connected to said receiving means and capacitor for bypassing the ambient light component of the photoelectric current during light projection in accordance with the stored signal of said capacitor;

extracting means, connected at the node between said receiving means and bypassing means, for extracting the photoelectric current during the light-projection and excluding the ambient light component eliminated by said bypassing means;

means for determining distance in accordance with the obtained reflected light pulse component;

means for supplying power at least to said receiving means and said maintaining means; and means for rapidly charging said capacitor from the supplying power means.

18. A distance measuring device as claimed in claim 17, wherein said rapid charging means is operable for a given time.

* * * * *